Feb. 23, 1960 P. M. BOURDON 2,925,875
AUTOMATIC GUIDING OF ROAD VEHICLES
Filed May 9, 1956 4 Sheets-Sheet 1

INVENTOR
PIERRE MARCEL BOURDON
BY
HIS ATTORNEYS

Feb. 23, 1960 P. M. BOURDON 2,925,875
AUTOMATIC GUIDING OF ROAD VEHICLES
Filed May 9, 1956 4 Sheets-Sheet 2

INVENTOR
PIERRE MARCEL BOURDON
BY
Campbell, Brumbaugh, Free & Graves
HIS ATTORNEYS

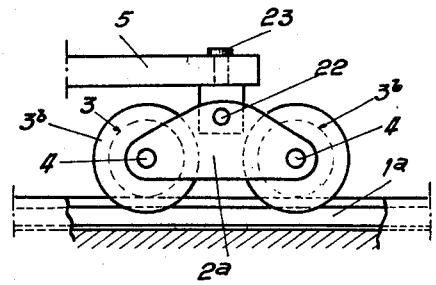
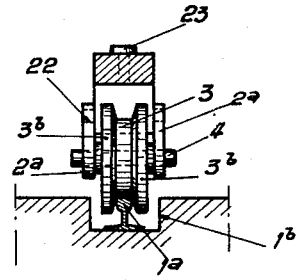
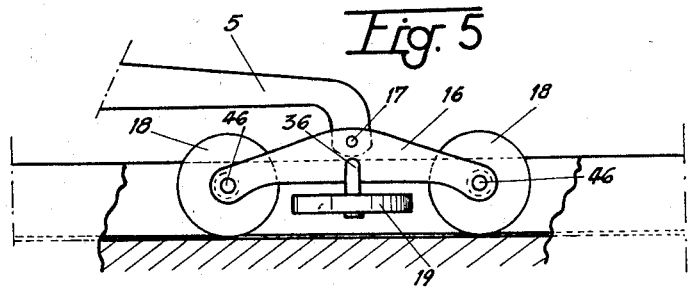
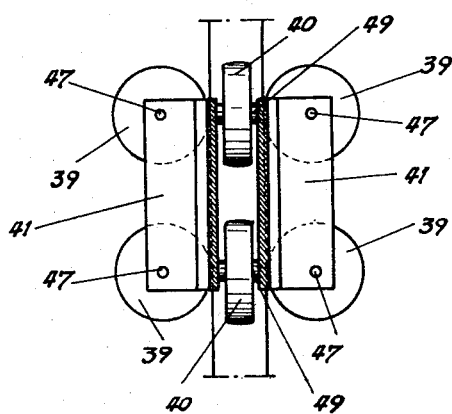
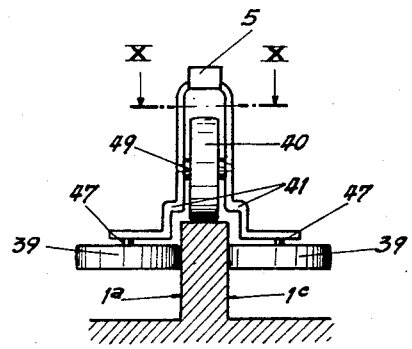

Feb. 23, 1960 P. M. BOURDON 2,925,875
AUTOMATIC GUIDING OF ROAD VEHICLES
Filed May 9, 1956 4 Sheets-Sheet 4
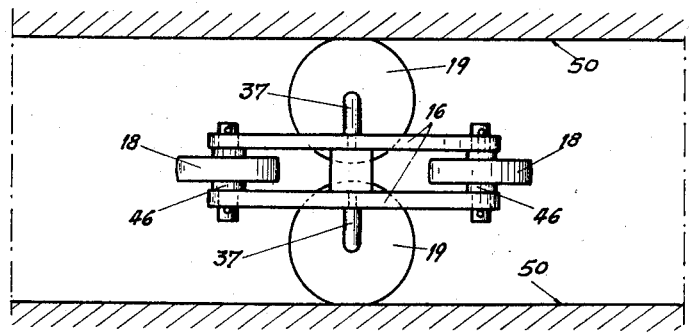
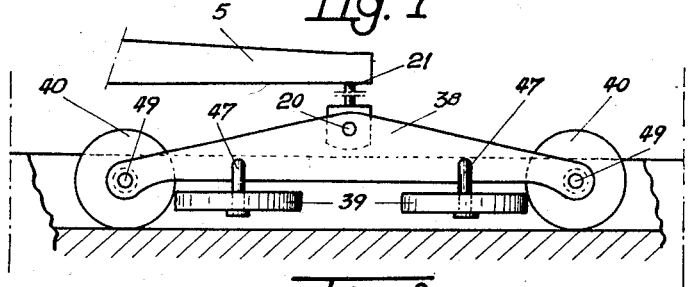
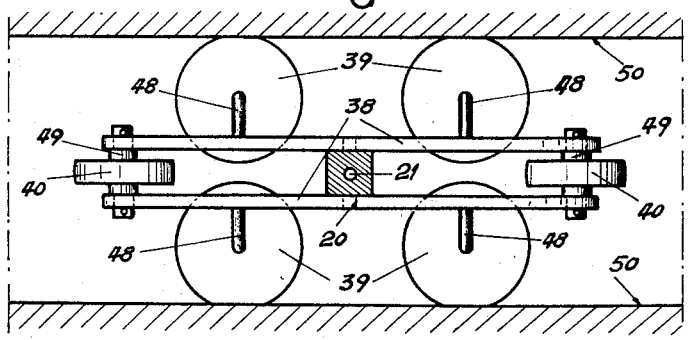
INVENTOR
PIERRE MARCEL BOURDON
BY
HIS ATTORNEYS United States Patent Office 2,925,875
Patented Feb. 23, 1960

2,925,875

AUTOMATIC GUIDING OF ROAD VEHICLES

Pierre Marcel Bourdon, Paris, France, assignor to Compagnie Generale des Etablissements Michelin (Robert Puiseux & Cie), Clermont-Ferrand, France Application May 9, 1956, Serial No. 583,817

Claims priority, application France May 12, 1955

7 Claims. (Cl. 180—79.2)

This invention relates to the automatic guiding of road vehicles.

It is sometimes desired to guide road vehicles very accurately. That is the case, in particular, when urban traffic problems lead to the provision of relatively short subways for use by trolley-buses and omnibuses in order that they may avoid, in the more crowded parts of towns, the traffic dislocation which they would cause by travelling on the surface. In such cases, in order that the subways may be of minimum width (this in the obvious interests of economy) the vehicles must be guided very accurately in the subway in order that they may not run into the subway wall or into each other when provision is made for two-way traffic. The invention is concerned with an automatic guiding device which achieves that object in a notable manner.

Automatic road vehicle guiding systems have already been proposed. These systems comprise low walls projecting from the ground which serve as guide paths or "reference tracks," or else use for guiding the vehicle the overhead trolley of electric vehicles. However, these two systems have important disadvantages. The first system, which necessitates a guide which projects upwards from the ground, can not be used if the guided vehicles are of great length or if the subway has relatively sharp bends. It is clear that in such cases, the rear wheels of the vehicle would have to pass to the other side of the walls—which they cannot do. The same applies when there is a guide channel of appreciable width. Furthermore, with such a guide, it is impossible to circulate through the subway vehicles other than those specially adapted thereto for automatic guiding.

In the second system, the steering of the wheels is controlled by the rotation of the trolley arm about the vertical axis, the overhead electric cable constituting the "reference track." This system has the disadvantage that as the arm is fixed to the upper part of the vehicle, its pivot is subjected to substantial transverse displacements as a result of rolling of the vehicle.

The result is that the arm rotates about its pivot and acts on the steering causing the vehicle to follow a tortuous path of unpredictable amplitude, particularly if it matches the rolling of the vehicle.

On the other hand, that system is insufficiently sensitive for the application for which this invention was made. Indeed, because of the length of the arm and the point (well behind the steering wheels) at which the arm is in contact with the line cable, the guiding effects are felt only when the axis of the vehicle is already well off the trajectory which it should theoretically follow. These departures from the true trajectory can be such as to make it impossible to be certain that a vehicle can pass through a space of limited width.

The invention is concerned with a guiding arrangement which overcomes all these disadvantages.

The reference track is constituted by a narrow slot formed in the ground. This slot is preferably of U-shaped section, its sides being formed, for example, by a strip of sheet metal bent to U-shape and fixed in the ground. It can however be constituted by the channel of the underground supply system of an existing tramway track system using the special device mentioned above; in that case, it comprises a narrow slot at ground level and a much wider slot at a certain depth. In certain quite exceptional cases, a slot of appreciable size or an upwardly projecting rail may even be used if the radius of the road curves permits although these arrangements preclude some of the advantages which the system in accordance with the invention has over the above-mentioned known systems. In all cases, the slot (or the rail) is arranged to follow the trajectory which is desirable for the reference track.

Moreover, the vehicle has beneath its chassis a feeler in the form of a universally mounted control rod which at its end carries a small carriage or slide herein after referred to as "the trolley" which rolls or slides within the slot. Rotation of this rod about its vertical pivot influences through a suitable transmission which may, for example, be mechanical or electrical, the steering wheels so as to maintain the vehicle on the desired course.

A guiding system based on that general principle is known, for example, from British Patent No. 299,756. That known system, however, has in practice important faults which limit its application to the case of the roundabout or the like described in the patent. These are that the guide member which follows the reference track is in the form of a single horizontal roller; when following a straight course or a circular course of constant curvature, the roller turns constantly in the same direction; but if the course includes a curve and a reverse curve, the roller will rub first on one side and then on the other of the track under the effect of centrifugal force and where the curve and reverse curve meet will have its direction of rotation suddenly reversed which leads to shocks and to considerable wear and even total destruction if the speed is substantial. Furthermore the mounting of the rod which carries the roller on the steering axle is too rigid and is not suitable only for a vehicle which is subjected to movements of different amplitude in different directions (horizontal and vertical) although it might be for a roundabout. Finally, it does not allow for transition from automatic to manual steering and vice versa.

Moreover, in the known systems of this kind, the member which pivots relatively to the chassis (referred to hereinafter for simplicity as "the rod") acts through a direct connection on the orientation of the steering wheels, which compels the vehicle to follow the desired course exactly.

However, I have found that these guiding systems are liable, in practice, to lead to disadvantages arising out of the fact that the guided end of the pivoted rod leaves the reference track when the force to be transmitted to the steering parts of the vehicle exceeds a certain value.

Indeed, the connection between the end of the rod and the reference track is necessarily of fairly light construction whereas the vehicle which is to be guided may be very heavy and move at a very substantial speed. In such a case, instead of the rod being guided by the reference track and rotating relatively to the vehicle and thereby orientating the vehicle wheels, the vehicle will drive the rod and force it to leave the reference track.

That disadvantage disappears, however, if the resistance of the mechanism controlling the orientation of the steering wheels to rotation of the rod relatively to the vehicle is extremely small so that the rod is to all intents and purposes "loose" relatively to the vehicle. In that case, the momentum of the vehicle will have no other effect than that of causing the rod to turn on its pivot while allowing it to act in the desired manner on the orientation of the steering wheels, the end of the rod remaining engaged with the reference track.

The invention consists therefore in a guiding device based on the general principle set out above but avoiding the various disadvantages which have been mentioned because of the use of a special guiding trolley mounted for universal pivotal movement on a supporting rod, associated with a steering servo and capable of being withdrawn to enable steering to be effected manually. One particular feature of the invention consists therefore in arranging in the connection between the rod and the device for orientation of the steering wheels of the vehicle a control servo of a kind ensuring that the rod need exert only a very small torque when it turns on its pivot in order to orientate the steering wheels of the vehicle as desired.

According to the invention, the movements of the guide rod are transmitted to the steering column, and the movements of that column control the orientation of the steering wheels through a direction controlling servo which may be of a kind known in itself and be operated by any available source of power—electric, pneumatic, hydraulic or even mechanical.

The servo control of the steering wheels of a vehicle is already known in itself. Heretofore it has been used for diminishing the force which the driver has to apply to the steering wheel for guiding the vehicle. In the present case, however, the servo control has quite a different purpose. It is not a question of providing power assistance for the driver but preventing the momentum of the vehicle from disconnecting the guide rod from the reference track. Such an application necessarily implies that it is a question of an automatically guided vehicle and is consequently quite different from known systems in which it is simply a question of manual steering of the vehicle.

It will be noted that the invention provides for very precise steering within narrow limits because of the very short length of the guide rod of the feeler and because the trolley can be disposed as near as is desired to the steering wheels, for example, directly beneath the latter or even ahead of them if desired. Consequently, the smallest deviation of the front part of the vehicle from the desired course leads instantaneously to rotation of the control rod and therefore to a correction. Also, as the slot is generally narrow and is below ground level, it does not impede vehicles which are not equipped for being guided nor the passage of the rear wheels of vehicles which are so equipped from one side to the other of the reference track when the vehicle takes a sharp bend.

Finally, the arrangement of a servo between the rod of the feeler and the steering mechanism, by providing the possibility of the feeler leaving the reference track allows the feeler to be made of much lighter construction and facilitate its withdrawal and its being disconnected when steering is to be effected manually.

An embodiment of the invention and various detail modifications are shown by way of example somewhat diagrammatically in the accompanying drawings, in which:

Figures 3 and 4 are respectively a front and side elevation of one form of trolley;

Figures 5 and 6 are respectively an elevation and plan of another form of trolley;

Figures 7 and 8 are views similar to those of Figures 5 and 6 of yet another form of trolley, and Figures 9 and 10 are a front elevation and a section through still another form of trolley, the section of Figure 10 being taken on the line X—X in Figure 9.

Clearly, the feeler must continuously follow the reference track whatever may be the inevitable variations in the height of the vehicle above the reference track resulting from variations in road surface level, deflection of vehicle springs and compression of tyres under different loads.

On the other hand, to enable the vehicle to be manually steered on an ordinary road, it must be possible to raise the feeler and at the same time disconnect it from the steering mechanism.

Figure 1:
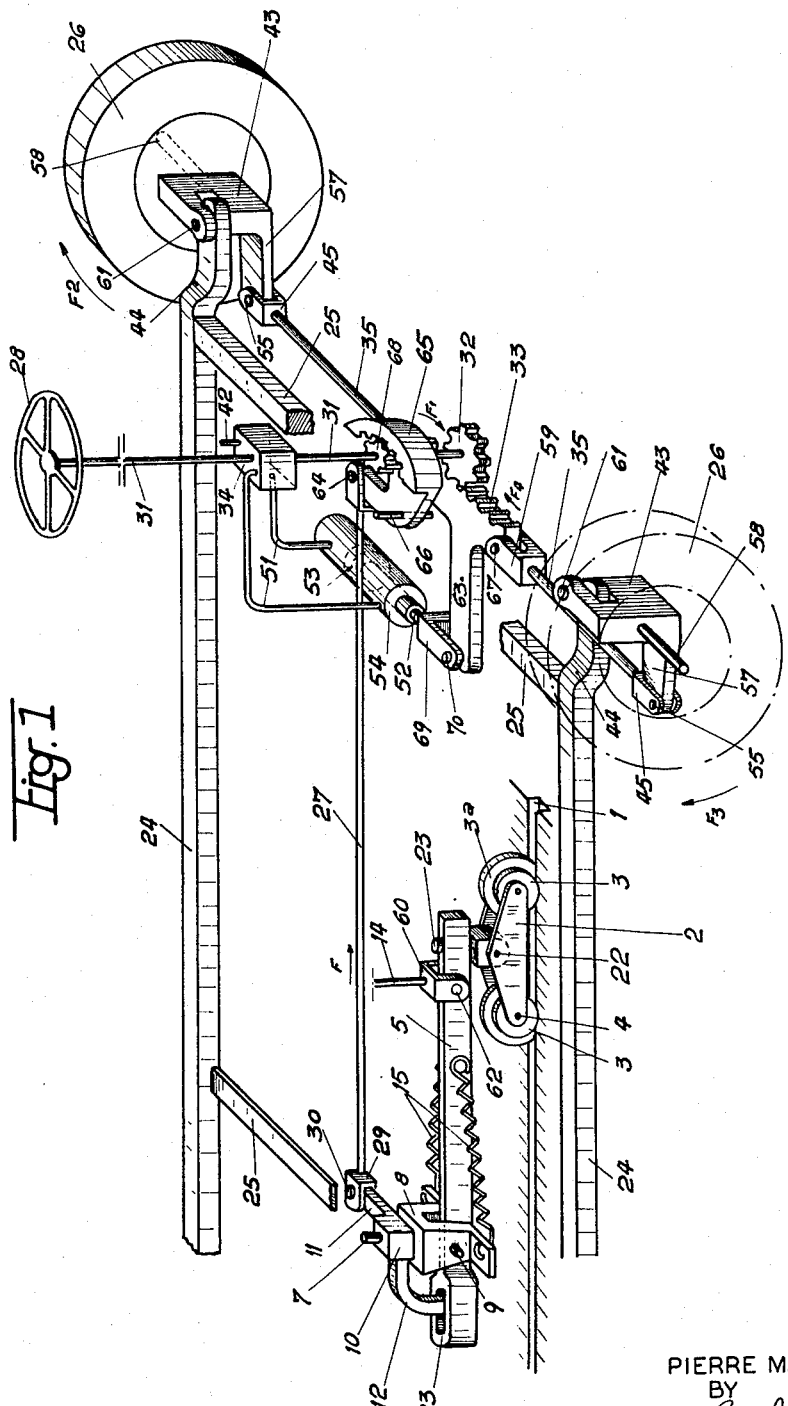
Figures 1 and 2 are perspective views with parts shown broken away showing the guiding system in the guiding and withdrawn positions respectively.
Figure 2:
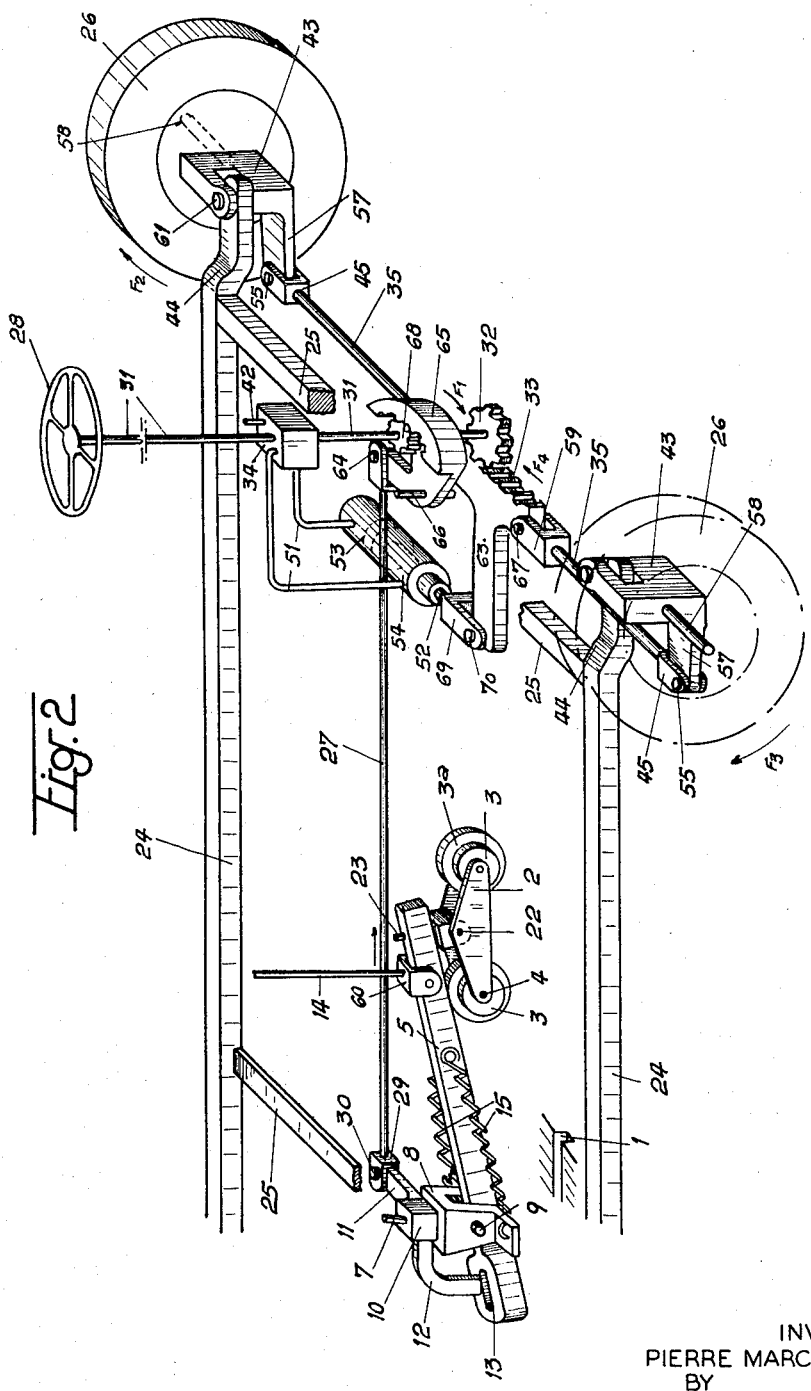

These conditions are satisfied by the use of the guiding system of Figures 1 and 2 and its variants shown in Figures 3–10.

For the sake of clearness, only those parts have been shown in the drawings which are strictly necessary for an understanding of the invention.

In the case of Figures 1 and 2, the reference track or guide rail 1 is preferably in the form of a gutter fixed in the ground. That has the advantage of allowing the circulation of all kinds of ordinary road vehicles and also of not impeding the circulation of tramcars the rails of which can be disposed on either side of the guide rail.

The guiding system is disposed beneath the chassis of the vehicle and is carried by the latter. Two longitudinal bearers 24 and two transverse bearers 25 are shown in Figures 1 and 2.

The feeler comprises a trolley having a frame 2 supporting a pair of rollers 3 on spindles 4. Between these rollers there is an enlargement 3a which can be engaged in the gutter of the guide rail 1.

The frame 2 is mounted for universal pivotal movement on the end of a lever 5. It has a horizontal pivot pin 22 and a vertical pivot pin 23 and can take up inclination in all directions relatively to the lever 5.

The rollers 3 can therefore always bear on the guide rail 1 and always tangentially thereto. The rollers are thus prevented from making with the rail an angle which encourages derailment as is well known in railway technique.

The lever 5 is also mounted beneath the vehicle for universal pivotal movement in the following manner. Beneath the vehicle there is fixed, for example, to a transverse bearer 25, a vertical stud 7 on which is mounted to turn a bracket 8 in the lower end of which there is a pin 9 on which the lever 5 is pivotally mounted.

On the stud 7 there is also mounted to turn a block 10 to which is fixed a lever 11 connected to the steering mechanism of the wheels 26 of the vehicle by a pin 30 passing through a fork 29 at the end of a rod 27, the rod 27 being connected to the steering column in a manner to be described further on.

The block 10 also has fixed to its a cranked arm 12 which can engage in a fork or slot 13 at or in the end of the lever remote from the trolley.

When the feeler is in its lowered position (Figure 1) that is to say when the vehicle is steered automatically by the guide rail 1, the arm 12 engages in the fork or slot 13 of the lever 5 and any rotation of the lever 5 about the vertical stud 7 results in rotation of the block 10 and the lever 11 and, therefore, acts on the wheels 26 through the connecting rod 27 and a directional servo actuated by the steering shaft.

When the vehicle is manually steered, turning by the driver of the steering wheel 28 turns the steering shaft 31 (which passes through the floor of the vehicle (not shown) through a suitable hole) and steers the wheels 26 through known devices such as a pinion 32 keyed on the shaft 31 and meshing with a rack 33 connected to the wheel axles 35.

The directional servo which is of a pattern known in itself comprises, in the example shown in the drawings, a distributor 34 controlled by the rotation of the steering wheel 28 and which sends through pipes 51 a fluid under pressure from a container (not shown) connected to the pipe 42. The fluid is applied to one or the other of the faces of a piston 53 mounted for movement in a cylinder 54. The thrust of the fluid on the piston is transmitted to the tie bar 35 between the wheels 26 through known devices shown diagrammatically as a connecting rod 52 connected to the piston 53 and acting through a horizontal fork 69 and a vertical pin 70 on an arm 63 at right angles to the rack 33 which controls the tie rod 35. The rod 35 influences the wheels 26 in a known manner through halfshafts 58 connected by a known form of suspension device 43 comprising a vertical pivot 61, both to an extension 44 of the longitudinal bearer 24 and to the rod 35 through a hinge comprising a horizontal fork 45 and a vertical pin 55 and a part 57 which is integral with the suspension device. The control servo (rod 52) reinforces the force exerted by the driver.

During automatic steering the vehicle is steered by the system described above.

In order to adapt this automatic steering system to a vehicle provided with a directional servo, it is necessary only to transmit the rotation of the rod 27 to the steering shaft 31. The manual action of the driver is thus replaced by that of the guiding system and the directional servo functions as in the case of manual steering.

The rod 27 can be connected to the shaft 31 as follows: the front end of the rod 27 is fixed to a horizontal fork 56 in which it is pivotally connected by a pin 64 to an internally toothed sector 65. The sector 65 rotates about a fixed shaft 66 carried by one of the transverse bearers 25 of the vehicle and meshes with a pinion 68 keyed to the shaft 31.

If the rod 5 turns so as to displace the rod 27 in the direction of the arrow F, the rod 27 causes the sector 65 and therefore the shaft 31 to turn in the direction of the arrow $F^1$ and the wheels 26 to turn in the direction of the arrows $F^2$ and $F^3$ respectively. The rack 33 moves in the direction of the arrow $F^4$.

The rack 33 and the tie bar 35 are connected in any suitable manner, for example by means of horizontal forks 59 and vertical pins 67 (only one of each is shown in Figures 1 and 2), or by a universal joint.

The ratio between the angle of rotation of the lever 11 and the pivoting angle of the steering wheels 26 is a function of the number of teeth in the gears and can be fixed at any given value such as 1.

In order to pass from automatic steering to manual steering the feeler is raised by means of a rod 14 integral with a vertical fork 60 through which passes a horizontal pin 62. The pin 62 passes through the lever 5 which itself passes through the floor of the vehicle (not shown). The rod 14 can be actuated by the driver or be actuated automatically, for example in the manner described in the U.S. application Serial No. 636,973, filed January 29, 1957 in respect of "Device for the Automatic Raising of a Movable Member Carried by a Vehicle." The fork or slot 13 is then lowered and disengaged from the lever 12. Thereupon it becomes possible to orientate the wheels 26 without at the same time having to move the lever 5 and its feeler which remain at rest in a housing (not shown) arranged beneath the vehicle. To that end the rod 14 comprises a device not shown (for example a spring loaded pawl) which can co-operate with a corresponding member (for example a notch) of a fixed part so to hold the rod 14 and the trolley at rest in the raised position. This kind of locking is well known and need not be described in detail.

It is, of course, clear that the connection of the lever 5 to the part 10 could be effected in a different manner. For example, the fork or the slot could be formed on the part 10 and receive the end of the lever 5.

Two springs 15 bearing on the lever 5 and the part 8 can be provided for increasing the pressure of the rollers 3 on the guide rail. If the guide rail, instead of being a narrow gutter, is an ordinary rail placed in a fairly large gutter or projecting from the ground, the roller 3 has only to be given the shape shown in Figures 3 and 4 in order that the same result may be obtained.

In that case each roller 3 has two enlargements 3b arranged on either side of the bulb of the rail 1a arranged in a gutter 1b and turns as before about a stud 4 carried by the chassis 2a.

The reference track can be in the form of a gutter wide enough to accommodate rollers with vertical axes. That case would arise if it were a question of using a tram track comprising a channel for underground current supply. In this case the channel has a fairly large cross-section below ground with only a narrow slot at ground level for giving passage to the suspension device for the plough. It is then sufficient to provide at the ends of the distance over which road vehicles using the tram track are to be guided traps analogous to those provided for allowing a tram car to pass from the underground feed system to the overhead wire system so as to allow the guiding system according to the invention to rise and to fall. Only the lever 5 (Figure 5) or the pin 21 (Figures 7 and 8) enters the narrow slot in the ground. In this case the feeler will be formed as shown in Figures 5 to 8.

In the construction of Figures 5 and 6 the frame 16 of the trolley is hinged to the lever 5 by means of a horizontal pin 17. The frame carries two rollers 18 having horizontal axes 46 and which roll in the bottom of the gutter. Two other rollers 19 having vertical shafts 36 are also carried by the frame 16 and bear against the lateral walls 50 of the gutter (Figure 6).

It is of no importance that the rollers 19 roll on the conductors supplying the current to the plough of tram cars circulating over the same stretch of road. In such a case it is simply a question of providing the rollers with pneumatic tyres or insulating covers and, if desired, making the trolley as a whole of insulating material.

The vertical shafts 36 (Figure 5) are themselves carried by arms 37 which are integral with the frame 16 (Figure 6).

Each of the rollers 19 turns always in the same direction. That would not be possible if there were a single roller with a vertical axis. According as such a roller were in contact with one or the other of the faces of the gutter it would turn in one or the other direction and thus give rise to shocks and wear.

In this construction the frame 16 keeps the lever 5 in the longitudinal direction and can, therefore, make a certain angle with the tangential direction of the guiding gutter. The rollers 18 will, therefore, not run strictly in their vertical plane and may at times slide lightly on the bottom of the gutter.

That disadvantage can be easily remedied by using the mounting shown in Figures 7 and 8, that is to say, by articulating the chassis 38 on the lever 5 by means of two pins, one horizontal 20 and the other vertical 21 (Figure 7). The stability of the trolley in the vertical plane is then given by four horizontal rollers 39 which roll against the vertical sides 50 of the gutter and in the horizontal plane is given by two vertical rollers 40. The mounting of the rollers 39 and 40 is similar to that of the rollers 18 and 19. It comprises vertical pins 47 (Figure 7) and horizontal arms 48 (Figure 8) for the rollers 39 and 40 carried by the frame 38 and horizontal pins 49 for the rollers 18 and 19.

Instead of being a gutter the reference track can project from the ground, as shown in Figures 9 and 10, if it is not a question of guiding ordinary vehicles and if the curves are not so sharp that the rear wheels of the vehicle are caused to cross the reference track. In such a case the horizontal rollers 39 roll on the vertical walls 1c of the rail 1a and the carrying rollers 40 which have horizontal shafts 49 roll on the upper part of the rail. The frame 41 of the trolley is then preferably formed as shown in Figures 9 and 10, that is to say, is formed of two parts each having a substantially L-shaped vertical section, the vertical limb of the L carrying the shafts 49 of the rollers 40 and the horizontal limb carrying the shafts 47 of the rollers 39, and the vertical limbs constituting together the sides of a forked member, the apex of which is made integral with the lever 5, either directly as shown in Figure 9 or through a linkage as shown in Figures 1 to 3.

It is, of course, to be understood that the embodiment described and shown is given merely by way of example and can be modified in respect of many details without exceeding the scope of the invention. For example, the pinions 32 and 68 could be replaced by toothed sectors as they do not have to effect rotations through 360°. Moreover, the steering system need not be of the rack type shown. The pinion 32 could be replaced by a suitable member keyed on the shaft 31. Finally, the servo mechanism, which is stated above to be pneumatic or hydraulic, could be of any other type without exceeding the scope of the invention.

I claim:

1. A device for guiding along a reference track a road vehicle having a vehicle chassis, a rotatable steering shaft and steerable wheels mounted on said chassis, comprising a servo motor connected to said steerable wheels for steering said steerable wheels, means connecting said steering shaft to said servo motor to control it to steer said wheels in response to rotation of said steering shaft, a trolley lever, a universal joint connecting said lever to said chassis for up and down and lateral movement relative to said chassis about substantially horizontal and vertical axes, a trolley frame mounted on one end of said trolley lever, at least one vertical roller mounted for rotation in said trolley frame for following said reference track, mechanism including a releasable coupling connecting said trolley lever to said steering shaft and rotating said shaft in response to lateral movement of said lever, and means connected with said releasable coupling for releasing it to disconnect said trolley lever from said steering shaft.

2. An automatic device for guiding along a reference track a road vehicle having a chassis, a rotatable steering shaft and steerable wheels, comprising a trolley frame, at least two vertical rollers adapted to follow the reference track rotatably mounted in said frame, a guide rod, a substantially horizontal pivot connecting one end of said rod and said trolley, a universal joint connecting the other end of said rod to the chassis of the vehicle for movement relative thereto, a lever pivotally connected to said chassis for movement substantially parallel therewith, a releasable coupling between the said lever and said rod, a gear fixed to said steering shaft, an internally toothed gear in mesh with said gear, a connecting rod having opposite ends pivotally connected to said lever and said internally toothed gear for rocking them simultaneously, a servo motor connected to said steerable wheels for steering them, means connecting said steering shaft to said servo motor for controlling it to steer said steerable wheels in response to rotation of said steering shaft, and means connected to said releasable coupling for disconnecting and connecting said releasable coupling.

3. The automatic device set forth in claim 2 in which each of said rollers of the trolley comprises a larger diameter wheel and smaller diameter disc-like portions concentric with and on opposite sides of said wheel.

4. The automatic device set forth in claim 2, in which each roller is a wheel having a centrally located circumferential groove therein.

5. The automatic device set forth in claim 2, comprising a pair of substantially horizontally disposed wheels mounted in said trolley frame on opposite sides of said vertical rollers.

6. The automatic device set forth in claim 2, comprising a substantially horizontally disposed roller on said trolley frame between said vertically disposed rollers.

7. An automatic device for guiding along a track a road vehicle having a chassis, a steering shaft and steerable wheels mounted on said chassis, comprising means connecting said steering shaft to said steerable wheels to steer the vehicle in response to rotation of said shaft, a trolley lever, means mounted on said trolley lever for following said track, a universal joint connecting said trolley lever to and supporting it on said chassis for movement up and down relative to said chassis around a substantially horizontal axis to disengage and engage said track following means and said track and laterally relative to said chassis around a substantially vertical axis, a coupling member, a pivot on said chassis substantially coaxial with the vertical axis of movement of said trolley lever supporting said coupling member for pivotal movement around said vertical axis, means connecting said coupling member to said steering shaft to rotate the latter in response to pivotal movement of said coupling member, engageable and disengageable coupling elements on said coupling member and said trolley lever to couple them together for simultaneous movement about their coaxial axes when said track following means engages said track, said coupling elements being disengageable to disconnect said trolley lever from said coupling member when said trolley lever is moved to disengage said track following means from said track, and means connected to said trolley lever to move it to disengage said track following means from said track.

References Cited in the file of this patent

UNITED STATES PATENTS

| | | |
|---|---|---|
| 2,068,403 | Ekstrom | Jan. 19, 1937 |
| 2,465,660 | Phillips | Mar. 29, 1949 |
| 2,468,158 | Barthalonew | Apr. 26, 1949 |

FOREIGN PATENTS

| | | |
|---|---|---|
| 102,385 | Great Britain | Mar. 29, 1917 |